United States Patent Office 3,264,631
Patented August 2, 1966

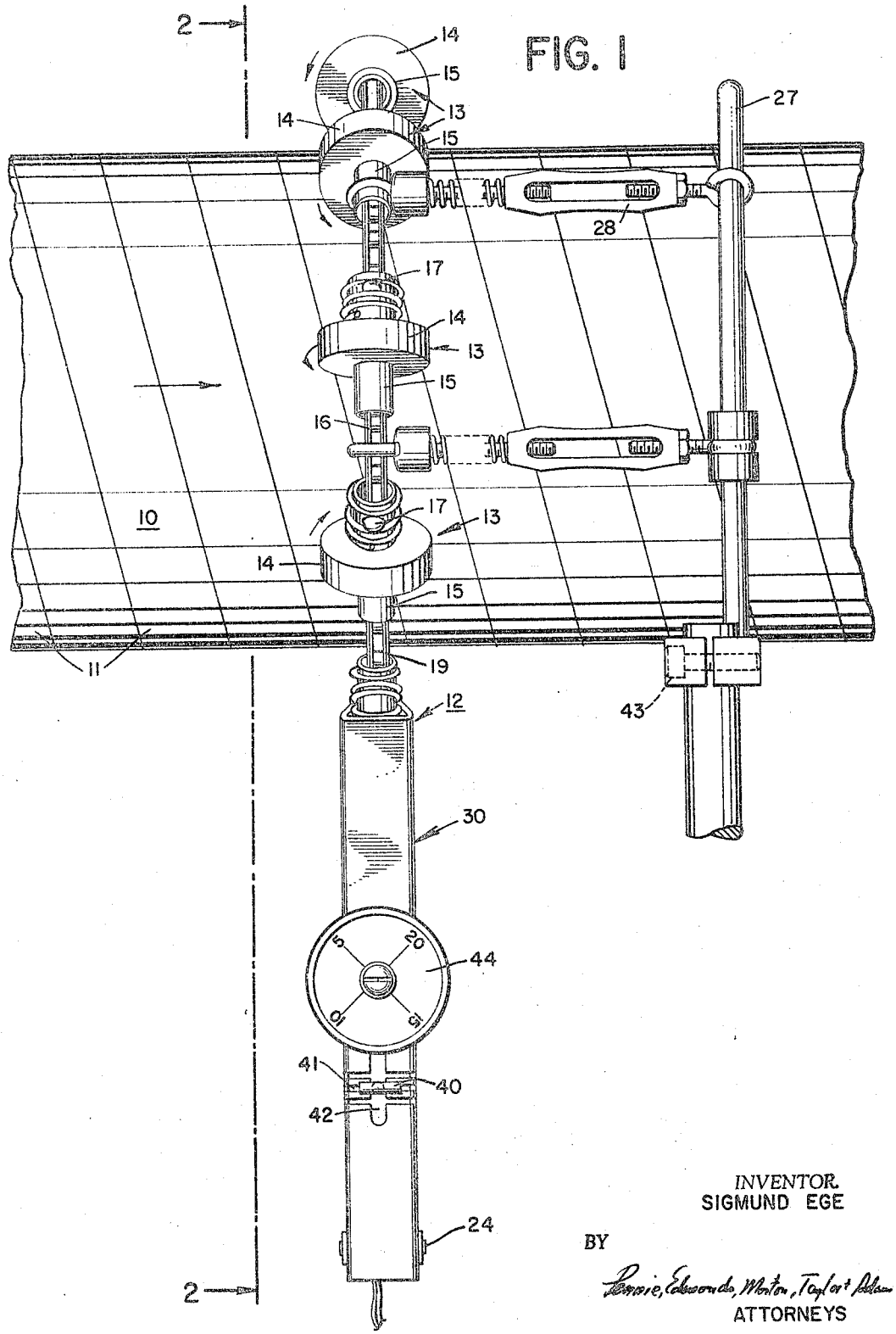

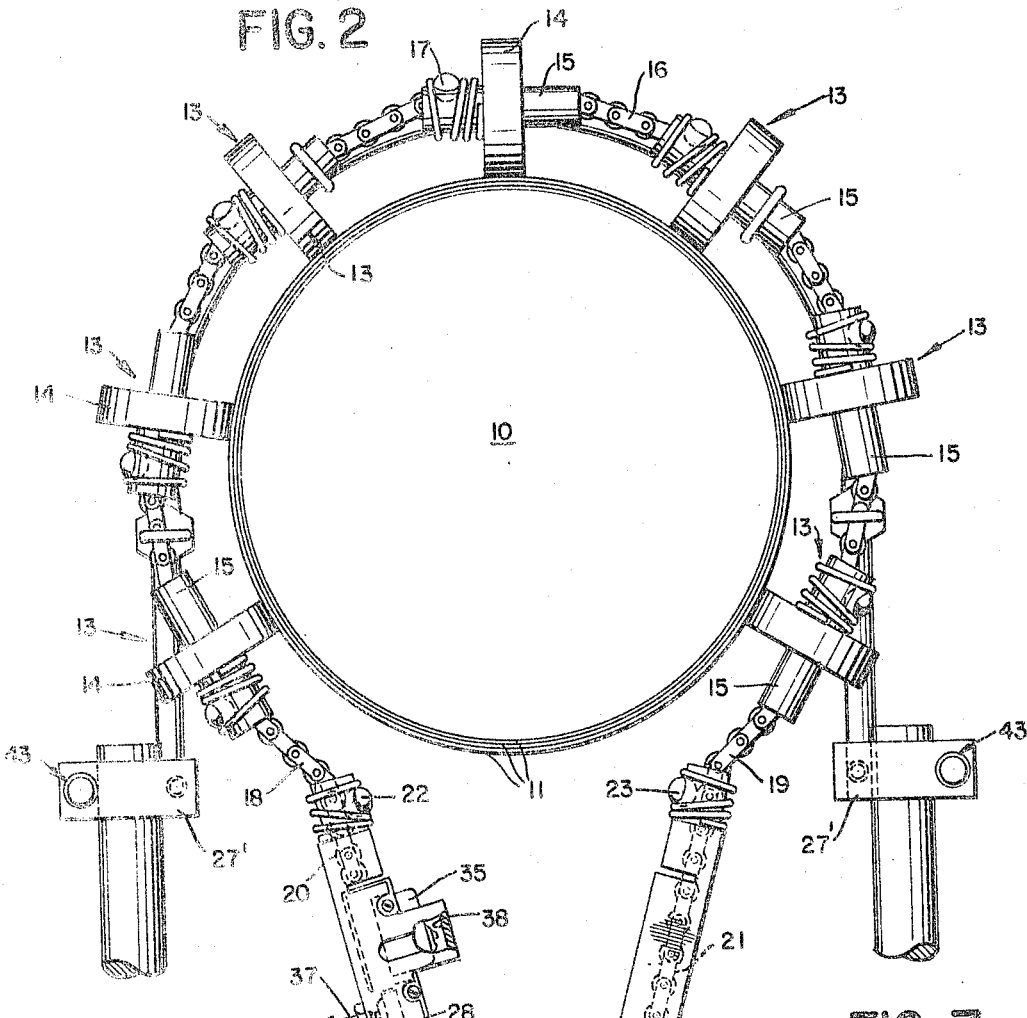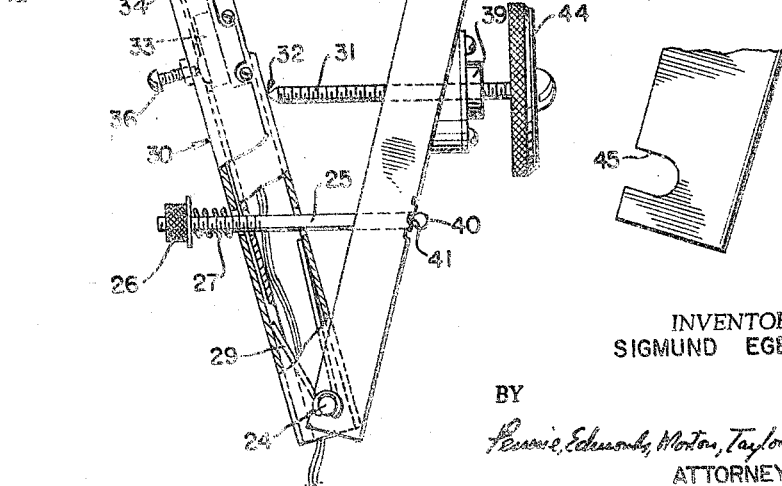

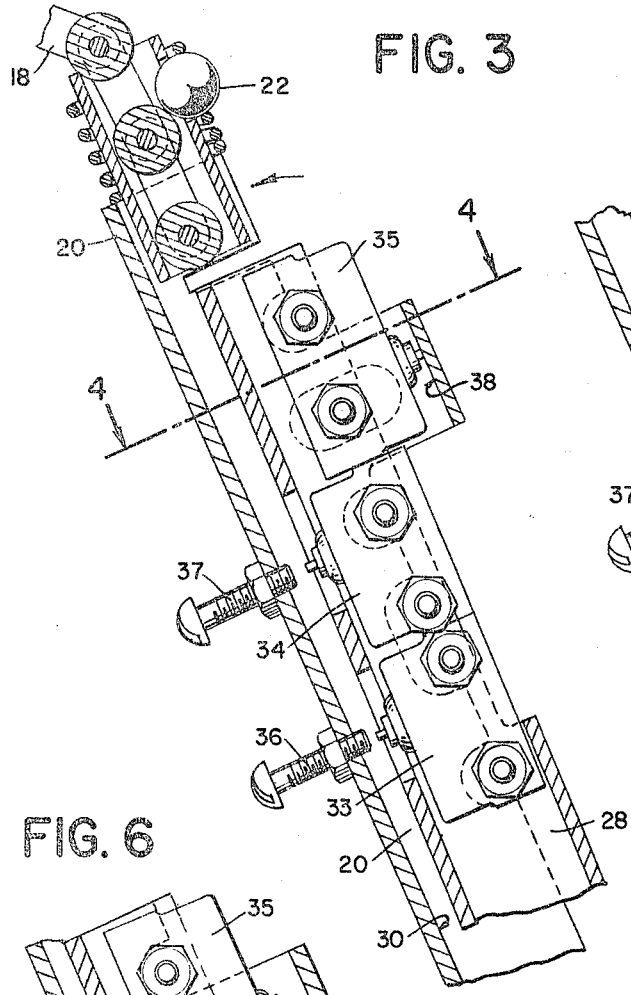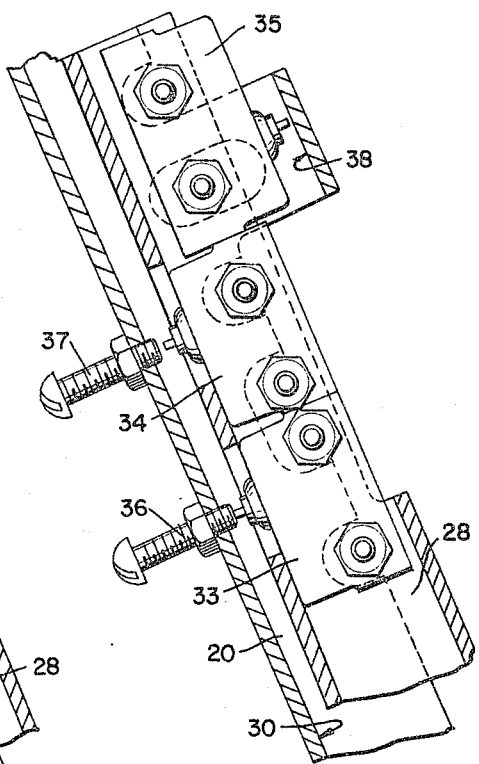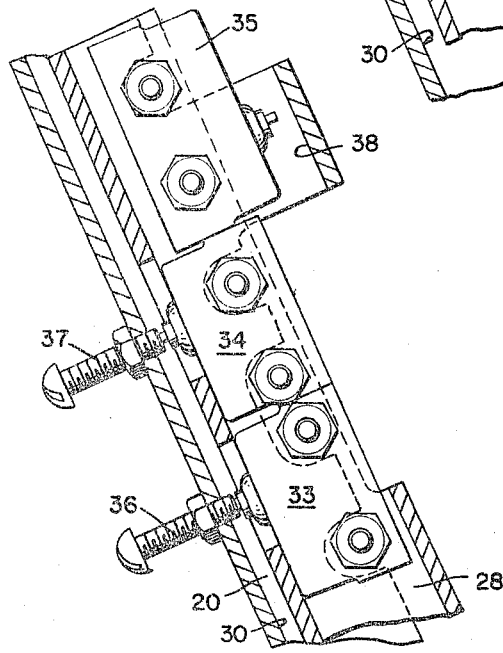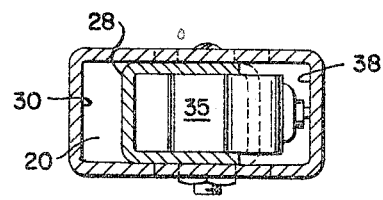

3,264,631
INDICATING GAUGE INCLUDING A CHAIN-LIKE MEMBER WRAPPED ABOUT A MAJOR PORTION OF THE CIRCUMFERENCE OF THE GAUGED WIRE-LIKE CONTINUOUS MOVING WEB FOR INDICATING IRREGULARITIES IN THE WEB CIRCUMFERENCE
Sigmund Ege, Hastings on Hudson, N.Y., assignor to Anaconda Wire and Cable Company, New York, N.Y., a corporation of Delaware
Filed Aug. 13, 1964, Ser. No. 389,285
5 Claims. (Cl. 340—259)

This invention relates to an apparatus used in detecting the irregularity of the circumferential surface of a cable advancing longitudinally in a given path. This apparatus is particularly suitable for use in detecting the surface irregularity of a cable due to the improper application of the helically wound insulation tape thereon.

Tapes made from materials such as paper are commonly used to provide insulation for electrical cables. The tape is helically wound on a cable in a taping machine. Multiple layers of this tape are used in order to give the required degrees of insulation. When taping electrical cables, it is essential that the tape applied on the cable is in a true helix with a narrow and uniform butt space between the adjacent edges of the tape. Should the tape weave during its application on the cable beyond the required tolerance limit or the allowed butt space, the tape in one turn will overlap the previous turn. The overlapped tapes disturb the application of additional layers of tapes causing additional overlap and create a void space at the lapped area which forms a soft spot in the insulation. When this part of the cable is bent around the drum of a pickup reel, the cable tends to bend more sharply at the soft spot which has the tendency to soften the insulation further. In the subsequent processing steps the cable is bent and straightened a number of times with the softness of the cable insulation at the lapped area increasing accordingly. The softness of the cable insulation may reach a point that the otherise satisfactory cable will be rejected for failure to meet the rigid requirement for an electrical cable.

A number of factors influence the weaving of the tape during its application on the cable. Predominantly the weaving is caused by a non-uniform cable diameter and mechanical difficulties of the taping machine such as uneven pullout, uneven rotation of the taping head, non-uniform tape thickness or the improper installation of the paper pad. Controlling all these and other factors to avoid an overlapping tape, even under rigid production control, is extremely difficult. Occasional overlapping of tapes in large-scale commercial production of electrical cables is, therefore, to be expected. However, if the occurrence of overlapping is detected immediately, repair is relatively simple with little time lost. Rejection of the cable due to a soft spot in its insulation can be completely eliminated. The repair of the cable is generally done by unwinding the overlapped tape and then carefully winding the tape back into proper form. Due to the limited space between each taping section in the cabling machine, the repair can only be made if the machine can be stopped before the overlapped tape has passed through one or two taping sections.

Heretofore, commercially available diameter gauges were used to detect the variations of the cable diameter. These gauges only detect two points of the cable at one time. For the purpose of detecting the overlapped tape, two or more of these gauges must be used in order to get an approximate picture of the over-all diameter change. Installation of a plurality of gauges on the taping machine is expensive. Furthermore, most taping machines are installed in a confined space where installing a plurality of gauges is not feasible.

It is, therefore, the principal object of the present invention to provide a simple and effective apparatus for use in detecting the surface irregularity as a result of the overlapped tape. Broadly stated, this apparatus comprises a plurality of detecting elements joined in a series to form a flexible chain. This chain surrounds a major portion of the periphery of the cable with the contacting elements engaging the circumferential surface. The ends of the flexible chain are connected to a first and a second gauge arm held in a predetermined angular relationship with respect to each other. Detecting means are provided in the apparatus to indicate the variations in the angular relationship between these two arms which corresponds to the variations of the circumferential size of the cable due to the irregularity of the cable surface. A rigid support is used to maintain the contacting elements in a fixed plane perpendicular to the longitudinal axis of the cable. Advantageously, the detecting means used is in the form of a switch element pivotally connected to one of the two gauge arms having switches electrically connected to indicating signals to indicate stepwise decrease and increase of the circumferential size of the cable. The switches on the switch element are activated and deactivated by a predetermined degree of variation of the angular relationship between the two arms.

Further to illustrate applicant's invention a specific embodiment is described hereinbelow with reference to the accompanying drawings wherein—

FIG. 1 is a side elevation of the present invention used for detecting the surface irregularity of a cable advancing longitudinally therethrough, FIG. 2 is a cross section taken from line 2—2 of FIG. 1, FIG. 3 is a fragmentary section of a switching element taken from FIG. 2 showing a second position of the microswitches, FIG. 4 is a cross section taken along line 4—4, FIG. 5 is a fragmentary section of a switching element taken from FIG. 2 showing a second position of the microswitches, FIG. 6 is a fragmentary section of a switching element taken from FIG. 2 showing still another position of the microswitches, and FIG. 7 is a fragmentary section of a gauge arm disconnected from a second gauge arm.

Referring initially to FIGS. 1 and 2, electrical cable 10 with helically wound tape 11 advances longitudinally passing through apparatus 12 of this invention. This apparatus comprises a plurality of contacting elements 13 in the form of ball bearing rollers 14 mounted on hollow tubular shafts 15. The hollow shafts are threaded on a roller chain 16 and secured thereon with conventional ball and spring locking devices 17 equipped at one end of the hollow shafts 15. The number of contacting elements and the length of the chain depends on the diameter of the cable which is subject to inspection for its irregularity. As a general rule, the length of the chain should be sufficiently long to surround a major portion of the cable's outer circumference and the number of the contacting elements should be as many as there can be conveniently placed on the chain. Preferably, these contacting elements are equally spaced throughout the chain length.

The ends of this roller chain are connected to ends 18 and 19 of two gauge arms 20 and 21, respectively, with ball and spring locking devices 22 and 23. This gauge is designed to test a wide range of different sizes of cables. Therefore, the length of chain 16 is selected to fit the maximum cable size intended. When the gauge is used to test smaller cables, the excess roller chain 16 can be stored in the hollow gauge arm 21 (as shown by the dotted lines). In assembling the apparatus 12 for use, the free ends of the gauge arms are rotatably connected with rotatable fasteners 24 to form a V-shaped gauge. The contacting rollers are brought into contact with the cable surface by reducing the angle formed by the two gauge arms 20 and 21 using connecting rods 25, adjustment screw 26 and spring 27. By adjusting the screw 26, the spring 27 urges the contacting roller into proper engagement with the surface of the cable and exerts the desired pressure thereon. To prevent the lateral movement, these contacting rollers are maintained at a plane perpendicular to the axis of the cable by firm supporting U-shaped structures 27 and turn buckles 28. Once the contacting rollers are maintained in a plane perpendicular to the traveling axis and the proper tension of the rollers exerted on the surface of the cable is adjusted, the variations in the diameter of the cable surface due to overlapped tapes and other surface irregularity will result in variations at the ends of the flexible chain increased by a factor of $\pi$ which in turn changes the angular relationship between gauge arms 20 and 21. By measuring the variation of the angular relationship of these two gauge arms, the change of the cable diameter can be conveniently and accurately determined.

For the purpose of detecting overlapped tapes, it is essential that the detecting means be sufficiently sensitive to differentiate such an occurrence from other variations of cable diameter due to, for example, minor surface irregularities or eccentricities of the cable which will not alter the effectiveness of the cable insulation. It is also essential that means are provided in the detecting apparatus to stop the advance of the cable machine when the overlapped tape is detected so that the necessary repairs can be made immediately. I find all these objectives and others can be accomplished simply and effectively by using a switch element as shown in the specific embodiment in the drawings and described hereinbelow.

Referring to FIG. 2, the switch element 28 is housed within the gauge arm 20 and pivotally mounted therein using the same rotatable fastener 24 that connects the gauge arms 20 and 21. A spring element 29 at the pivotal end of the switch element is used to force the switch element 28 away from the wall 30 of the gauge arm 20. The pivotal movement of the switch element 28 is limited by an adjustment screw 31 mounted on the gauge arm 21 and contacts the switch element at 32. The combined actions of spring 29 and adjusting screw 31 cause the pivotal movement of the switch element 28 to follow that of the arm 21. The upper end portion of this switch element is equipped with microswitches 33, 34 and 35. Switches 34 and 35 are mounted one above the other on one side of the switch element facing wall 30 and directly facing screws 36 and 37. Microswitch 35 is mounted on the opposite side of the switch element 28 and positioned above switches 34 facing wall 38. The arrangement of the switches is more clearly shown in FIGS. 3, 5 and 6.

Arranging the switch element in the manner described, the angular movement of the gauge arms 20 and 21 due to the variation of the cable diameter is indicated proportionally by the variations of the angular relationship between the switch element 28 and the gauge arm 20. The larger and substantially rectangular cross section of the gauge arm 20, as shown in FIG. 4, permits only a limited pivotal movement of the switch element 28 housed therein. When the variation of the angular relationship between gauge arm 20 and switch element 28 is above the limit, the relative movement of the gauge arm and the switch element closes one or more of the microswitches depending on the direction of the movement. It is apparent by properly connecting these microswitches to indicating means, such as light bulbs and recorders, stepwise increase or decrease of the cable diameter can be indicated and recorded.

For detecting overlapped tapes, the switch element is adjusted so that the plunger of switch 33 is normally depressed by screw 36 while the other two switches are open, as shown in FIG. 5. In this arrangement a decrease of the angular relationship between the gauge arm 20 and the switch element 28, as a result of the decrease in the cable diameter, will cause switch 34 to come in contact with screw 37 (see FIG. 6), which activates a light or a recorder to signify the occurrence of the event. Conversely, an increase in cable diameter will remove the depression of the plunger on switch 33. Selecting a microswitch of the "normally closed" type, the release of the plunger activates the switch 33 which may in turn energize a light bulb or a recorder to show the decrease of the cable diameter. Upon further increase of cable diameter, the plunger of switch 35 comes into contact with wall 38 (see FIG. 3 and 4) which preferably shuts off the machine.

The adjustment of the gauge to a certain cable diameter is conveniently done by turning the adjustment screw 31 first in one direction until one of the lights indicating the high or low in cable diameter is lit, then the screw 31 is turned in the opposite direction until the other light goes on. Finally, the position of the dial is set midway between the first and the second positions. This adjustment is facilitated by the markings on the dial 44 for the screw 31. Normally, fine adjustment screws 36 and 37, once they are set, no further adjustment is necessary. If it is desirable to change the tolerance limits between low and high indications and also between the high indication and the shutdown of the machine, the adjustment screw 31 is first turned in one direction until the light that indicates the shutdown of the machine goes on by closing switch 35, then it is turned in the reverse direction for an angle which, according to the predetermined scale on dial 44, corresponds to the desired number of mils diameter increase between "high diameter" indication and "machine-shutdown." Screw 36 is now adjusted so that switch 33 requires only a slight further turning of adjustment screw 31 before activation. Screw 37 is adjusted in a similar manner by first turning screw 31 in one direction for an angle corresponding to the desired tolerance between the "low diameter" and the "high diameter" indications, then locking screw 37 in a position where a slight further turning of 31 activates switch 34. Using a roller chain and spring locking device the gauge together with this fine adjustment feature can be used on a wide variety of cables and still enables the operator to quickly adjust it to a very close tolerance limit.

In a specific example, screws 36 and 37 may be adjusted so that the switch 34 operates at a 5 mils drop in the cable diameter. The microswitch 34 is connected to a green light and a continuous recording device so that a decrease in diameter of more than 5 mils will light the green light and move the pen of the recorder to one side, indicating the 5 mils drop in the cable diameter. Switch 33 is similarly connected to light an amber light and, at the same time, move the pen of the recorder to the opposite direction to indicate the increase of 5 mils in the diameter of the cable. The switch 35 is connected to a red light and the switch circuit which will automatically shut off the machine when the switch 35 is activated due to a further increase in cable diameter of 5 mils. This arrangement allows the gauge apparatus of this invention to detect overlapped tapes and, at the same time, is capable of indicating minor surface irregularities without shutting off the taping machine.

In detecting the overlapped tapes where the cable advances longitudinally through the contacting rollers 14, the overlapped portion of the cable, which has a larger over-all cable circumference corresponding to at least the thickness of the tape, causes a sudden change in the angular relationship between the gauge arms. The change in this angular relationship is corresponding, in this specific example, to at least an increase of 10 mils in the cable diameter (for a paper tape above 5 mils thick) which is sufficient to activate switch 35 and turn off the taping machine for the necessary repair. On the other hand, when the cable diameter variation is minor and less than 10 mils but more than 5 mils due to, for example, minor surface irregularity and eccentricity of the cable and other factors, the increase and the decrease of the cable will close the contact of switch 33 or switch 34, respectively, and correspondingly is indicated by the recorder. If the change is gradual or continues, the recorder will indicate such minor variations in the cable diameter. Adjustment of the gauge or checking the cable may be necessary. When the variation of the cable diameter is below 5 mils, well within the manufacturer's tolerance limit, the gauge will not record such minor variations.

In actual use, several diameter gauges may be used on a taping machine. The same recorder can be used for all gauges by installing, for example, one pen for each gauge. This arrangement will make it possible to determine afterwards where the cause of a local increase in diameter was likely to have occurred. Since, if the conductor was at fault, the local diameter increase should have been detected by the first diameter gauge as well as the others in turn and recorded correspondingly on the chart. This enables further the machine operator to have more complete control during the taping operation.

The gauge of the present invention can be assembled on and removed from the taping machine quickly. In disassembling the gauge, pressure is exerted on the nut 26 which depresses the spring 27 and forces cross bar element 40 connected to rod 25 from groove 41. By turning cross bar element 40 from its horizontal position to a vertical position the connecting assembly can be removed through slot 42 (FIG. 1). After loosening screw 24, arm 21 which is equipped with slot 45 for quick removal (FIG. 7) can be separated from arm 20, and the whole gauge including the U shape structure can be lifted away from the cable. Since the removal of the gauge does not disturb the fine adjustments of the microswitches, reassembly of the gauge subsequent to repair will not require additional fine adjustments.

To reassemble the gauge, arm 21 is first connected to arm 20. Rod 25 with cross bar 40 at its end is then inserted through slot 42 with cross bar 40 in horizontal position. By turning the bar 40 to a vertical position, spring 27 forces bar 40 to fall into slot 41 and the gauge is ready for service.

While the description of this apparatus is pertinent to the use of detecting overlapped tape of a cable, modification can be made to use the gauge to determine cable diameters. For example, a micrometer can be installed between arms 20 and 21 to record continuously the variation of its angular relationship corresponding to the variations of the cable diameter.

I claim:
1. An apparatus for use in detecting the irregularity of the circumferential surface of a cable advancing longitudinally in a given path, the apparatus comprising:
    (a) a plurality of contacting elements joined in series to form a flexible chain, said chain surrounding a major portion of the periphery of said cable with the contacting elements engaging said surface,
    (b) a first arm connected to one end of the chain,
    (c) a second arm connected to the other end of the chain and held in a predetermined angular relationship with said first arm, and
    (d) means for detecting the variance of said angular relationship corresponding to the variance of the circumferential size of the cable due to the irregularity of its surface.

2. An apparatus for use in detecting the irregularity of the circumferential surface of a cable advancing longitudinally in a given path, the apparatus comprising:
    (a) a plurality of contacting elements joined in series to form a flexible chain, said chain surrounding a major portion of the periphery of said cable with the contacting elements engaging said surface,
    (b) a supporting structure connected to said chain and spacing said contacting elements geometrically in a plane perpendicular to the longitudinal axis of said cable,
    (c) a first arm connected to one end of the chain,
    (d) a second arm connected to the other end of the chain and held in a predetermined angular relationship with said first arm, and
    (e) means for detecting the variance of said angular relationship corresponding to the variance of the circumferential size of the cable due to the irregularity of its surface.

3. An apparatus for use in detecting the irregularity of the circumferential surface of a cable advancing longitudinally in a given path, the apparatus comprising:
    (a) a plurality of contacting elements joined in series to form a flexible chain, said chain surrounding a major portion of the periphery of said cable with the contacting elements engaging said surface,
    (b) a supporting structure connected to said chain and spacing the contacting elements geometrically in a plane perpendicular to the longitudinal axis of said cable,
    (c) a first arm connected to one end of the chain,
    (d) a second arm connected to the other end of the chain and held in a predetermined angular relationship with said first arm, and
    (e) a switch element pivotally connected to the second arm having a plurality of switches electrically connected to indicating signals, said switches being turned on and off corresponding to the angular variation between the first and the second arms whereby the switches turn on and off their corresponding indicating signals.

4. An apparatus for use in detecting the irregularity of the circumferential surface of a cable advancing longitudinally in a given path, the apparatus comprising:
    (a) a plurality of rollers rotatably mounted on a flexible chain, said chain surrounding a major portion of the periphery of said cable with the rollers rotatably engaging said surface,
    (b) a supporting structure connected to said chain and spacing said rollers geometrically in a plane perpendicular to the longitudinal axis of said cable,
    (c) a first arm connected to one end of the chain,
    (d) a second arm connected to the other end of the chain and held in a predetermined angular relationship with said first arm,
    (e) a switch element pivotally connected to the second arm having a plurality of switches electrically connected to indicating signals, said switches being turned on and off corresponding to the angular variation between the first and the second arms whereby the switches turn on and off their corresponding indicating signals, and
    (f) automatic shut-off means for stopping the advances of said cable when the variation of the angular relationship is above a predetermined value.

5. An apparatus for use in detecting the irregularity of a cable surface helically wound with paper tape for its insulation and advancing longitudinally in a given path, the apparatus comprising:
    (a) a plurality of contacting rollers rotatably mounted on a flexible chain surrounding a major portion of the periphery of said cable with the contacting elements engaging said surface,
    (b) a supporting structure connected to said chain for maintaining said contacting rollers in a plane perpendicular to the longitudinal axis of said cable,
    (c) a first arm connected to one end of the chain,
    (d) a second arm connected to the other end of the chain and held in a predetermined angular relationship with said first arm, and
    (e) a switch element pivotally connected to the second arm having a first switch electrically connected to an indicating signal to indicate the decreases of the circumferential size of the cable, a second switch electrically connected to an indicating signal for indicating the increases in the circumferential size of said cable and the third switch means for stopping the advance of said cable when the increase in the circumferential size of said cable is above a predetermined value, said switches being positioned on said switch elements so as to correspond to the variation of angular relationship between said first arm and said second arm and being activated and deactivated by contacting said switches with the second arm due to the variation of said angular relationship.

No references cited.

NEIL C. READ, *Primary Examiner.*

R. M. GOLDMAN, *Assistant Examiner.*